M. LACHMAN.
METAL POLE.
APPLICATION FILED MAY 8, 1916.
1,332,669.
Patented Mar. 2, 1920.
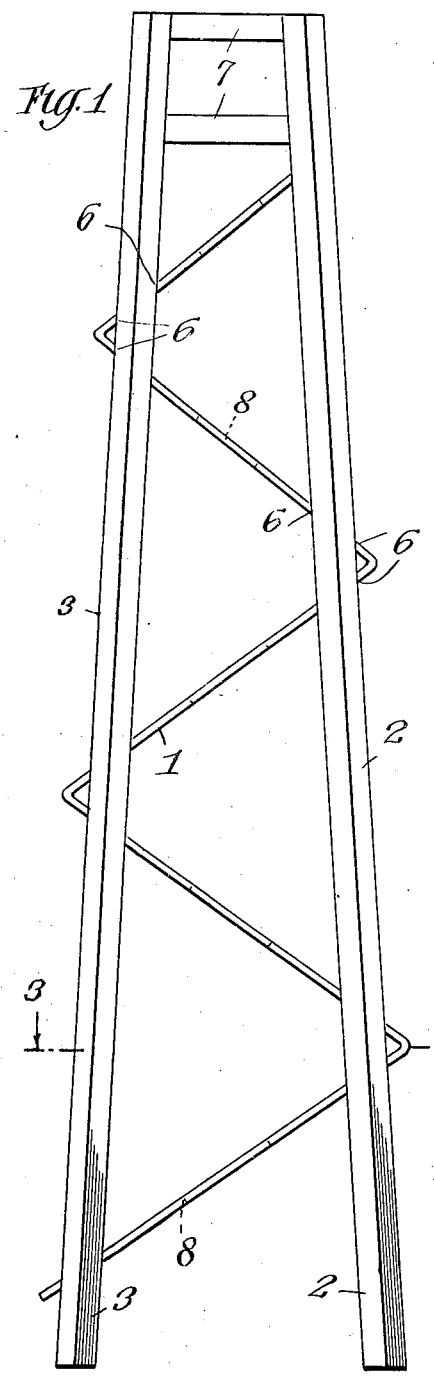
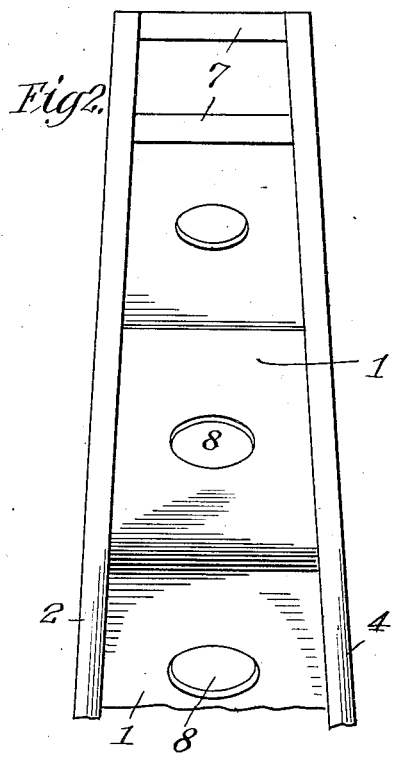
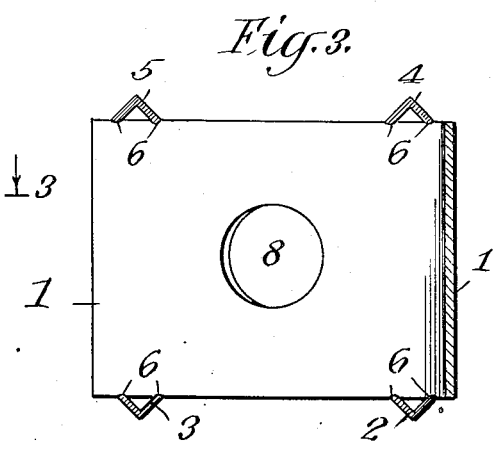
INVENTOR
Maurice Lachman
BY
Townsend & Decker
ATTORNEYS

UNITED STATES PATENT OFFICE.

MAURICE LACHMAN, OF NEW YORK, N. Y., ASSIGNOR TO UNIVERSAL ELECTRIC WELDING COMPANY, OF NEW YORK, N. Y., A CORPORATION OF NEW YORK.

METAL POLE.

1,332,669.   Specification of Letters Patent.   Patented Mar. 2, 1920.

Application filed May 8, 1916. Serial No. 96,022.

*To all whom it may concern:*

Be it known that I, MAURICE LACHMAN, a citizen of the United States, and a resident of New York, in the county of New York and State of New York, have invented certain new and useful Improvements in Metal Poles, of which the following is a specification.

My present invention relates to the construction of metal telegraph poles or posts, trolley poles and the like and has for its object to produce a strong structure of low cost to manufacture.

The invention consists in the improved construction of pole, post or column hereinafter more particularly described and then specified in the claim.

In the accompanying drawings, Figure 1 is a side elevation of a tapered pole constructed in accordance with this invention.

Fig. 2 is another side elevation of the same looking at 90 degrees to the side shown in Fig. 1.

Fig. 3 is a horizontal transverse cross-section taken on the line 3—3 Fig. 1.

The structure is designed primarily for a telegraph pole although it may be used for numerous other pole purposes. When constructed for use as a telegraph pole the structure preferably tapers from the bottom to the top although it will be understood that the invention is not limited to a tapered structure.

In the drawings 1 indicates a continuous zig zag metallic member forming the main body of the pole. The member 1 is suitably formed in any desired manner from a length of material of a width about equal to the desired diameter of pole required. The material is bent laterally at an angle to the plane of its surface at intervals spaced the desired distance apart, the angles between the adjacent legs being preferably 90 degrees. For a tapered pole the distances between the legs forming the zig zag arrangement become shorter as the material goes from the bottom toward the top of the structure and to provide the taper on all sides, if desired, the edges of the material of the member 1 taper from one end to the other.

2, 3, 4 and 5 indicate upright bars preferably V-shaped in cross-section. Each bar is placed in contact with the edge of the member 1 near the turns at the corner thereof preferably by presenting the free edges of the open side of the bars to the edge of the member. The bars 2, 3, 4 and 5 are arranged in pairs bearing against opposite edges of the member 1 and follow the taper of the sides of said member. The flanges of the bars intersect the free edges at four points in each angle formed by the zig zag arrangement of the member 1. In this position the bars are each welded to the member 1 at each point of intersection preferably by the electric welding process as the intersecting edges form ideal welding conditions to secure a quick, strong union of the parts. In the welding process the flanges become depressed into the edges of the member 1 as indicated in Fig. 3, the points of weld being indicated at 6.

If desired the zig zag member may terminate some distance from the top of the pole and the balance of the pole completed by welding straight transverse pieces 7 to the uprights.

If it is desired to lighten the weight of the structure this may be done without materially decreasing its strength by removing some of the metal from the legs of the zig zag member as by providing openings 8 therein of proper size.

By this construction great strength is obtained by the solid metal body portion which is held rigidly in truss relation by the upright members while at the same time the manufacture is greatly simplified and cheapened owing the the few number of separate parts necessary to handle.

It will be understood that the invention is not limited to any particular shape or arrangement of parts except as may be specifically recited in the appended claim.

The invention claimed is:—

A metal pole or post comprising a continuous zig zag member forming the body of the pole and V-shaped upright members arranged in pairs and having the free edges along the open side intersect the edges of said member at four points in each angle thereof, said members being welded to each other at such intersecting points and said zig zag member being provided with perforations in the body thereof.

Signed at New York, in the county of New York and State of New York, this 28th day of December, A. D. 1915.

MAURICE LACHMAN.

Witnesses:
W. R. WARNER,
F. B. TOWNSEND.